United States Patent Office 3,000,846
Patented Sept. 19, 1961

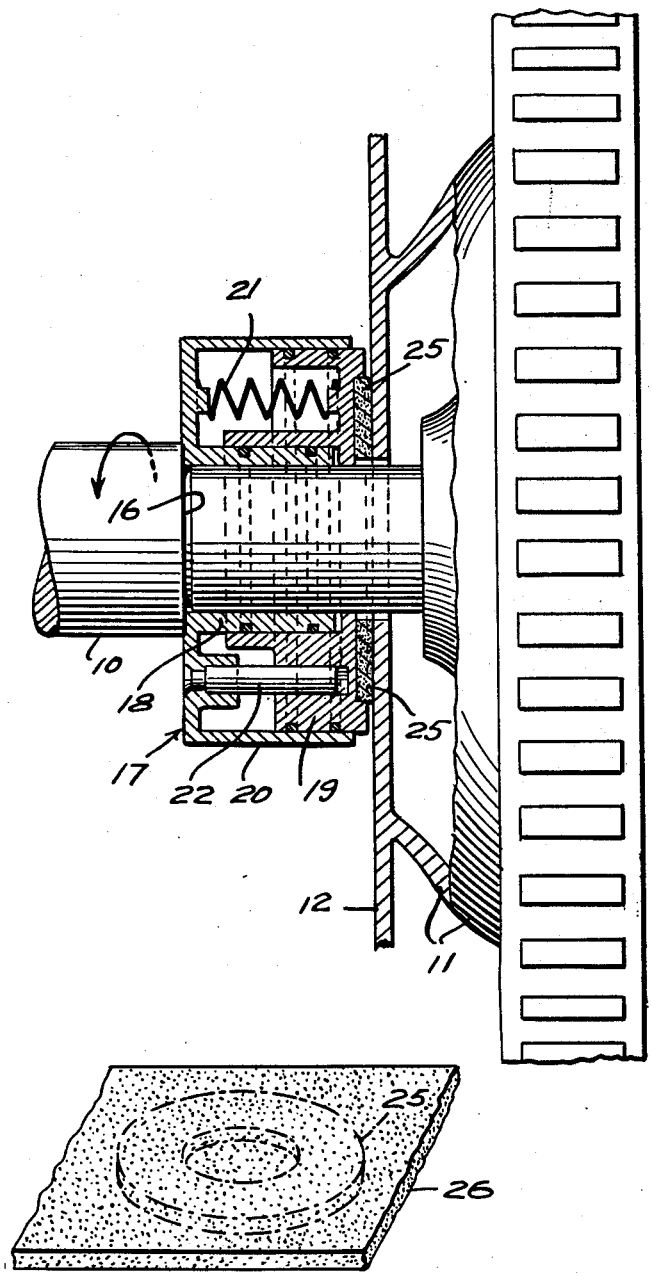
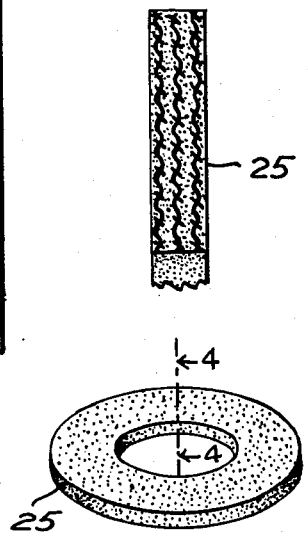

---

3,000,846
HIGH TEMPERATURE MOLDED FABRIC PACKING GLAND
Leslie A. Runton, Middle Haddam, and Henry C. Morton, Branford, Conn., assignors to The Russell Manufacturing Company, Middletown, Conn., a corporation of Connecticut
Filed Nov. 19, 1957, Ser. No. 697,421
1 Claim. (Cl. 260—41)

This invention relates to packing glands for use at high temperatures and more particularly to a gland for sealing turbine chambers or the like wherein substantial pressures are maintained at high temperatures.

An object is to provide a packing gland of the above type having novel and improved characteristics.

Another object is to provide a gland of the above type which is suited to commercial operations.

Another object is to provide a packing gland for sealing the turbine chambers of gas turbines driving fuel pumps in rocket engines.

A more specific object is to provide a composition suitable for the above purpose.

In accordance with the present invention a fabric woven from yarns composed of ceramic fibers is impregnated with and bonded by a ceramic cement containing antifriction components which impart the necessary surface characteristics to the gland. The impregnated fabric is molded under heat and pressure to the form required, for example, into the form of a flat sheet or ring which may be used as a packing gland for sealing a turbine shaft to a stationary housing.

The nature of the invention will be better understood from the following description, taken in connection with the accompanying drawing in which a specific embodiment has been set forth for purposes of illustration.

In the drawing:

FIG. 1 is a broken elevation of a portion of a gas turbine embodying the invention;

FIG. 2 is a broken perspective of a molded sheet from which the gland is stamped;

FIG. 3 is a perspective of the gland; and

FIG. 4 is a section taken on the line 4—4 of FIG. 3 but on a larger scale.

Referring to the drawing more in detail, a turbine rotor having a shaft 10 is mounted in a housing 11 forming a high pressure, high temperature turbine chamber having a wall 12 through which the shaft 10 extends. The shaft may drive a pump or compressor (not shown). The shaft 10 is shown as having a shoulder 16 against which a cup 17 rests. The cup 17 is provided with a hub 18 which is journalled on the shaft 10. A cap 19 is formed with an annular flange sliding in the wall 20 of the cup 17 and pressed outwardly by a series of springs 21. Pins 22 key the cap 19 to the cup 17.

A gland in the form of a sealing ring 25 rides on the shaft 10 and is held by the cap 19 in sealing contact with the stationary wall 12 through which the shaft 10 extends. The construction thus far described is conventional and only so much thereof has been set forth as is necessary to an understanding of the invention.

In accordance with the invention the ring 25 is formed from a fabric 26 composed of ceramic fibers, molded and bonded in a ceramic cement containing low friction materials which are exposed on the contacting surfaces thereof.

The fabric 26, as shown in FIG. 4, is woven from yarns composed of spun aluminum silicate fibers or quartz (SiO$_2$) fibers or a mixture thereof. The yarn may be loosely twisted and the fabric loosely woven to facilitate the impregnation and bonding thereof by the ceramic cement.

The cement, which is to bond the ceramic fibers together, may be composed of phosphoric acid, sodium silicate, magnesium oxychloride or zirconium dioxide. To this cement while in liquid form is added a low friction synthetic resin or short flock cut from yarn composed of such resin. The resin may be of the polymeric fluorocarbon type, for example, tetrafluoroethylene (Teflon), monochlorotrifluoroethylene (Kel-F), and fluorothene, together with carbon in graphite form which may be crystallized or amorphous.

The following is an example of a composition for making a packing gland:

|  | Percent |
|---|---|
| Ceramic cement composed of any of the above mentioned compounds | 80 |
| Low friction resin flock | 10 |
| Graphite | 10 |

The flock and graphite are dispersed throughout the liquid. The fabric is immersed in and impregnated with this liquid which is then molded under a pressure of 1 to 5 tons per square inch to cause the liquid to enter the interstices of the yarn, at a temperature of 240° F. for a few minutes to cure the cement and set the mixture into the form of a rigid sheet 27 as shown in FIG. 2. The gland 25 is stamped from the sheet 27.

In use the flock on the surface slowly distintegrates at high temperature and if the temperature is sufficiently high the graphite also burns away. Then deterioration proceeds at a slow rate as fresh surfaces are exposed and the thickness of the gland is designed to provide the required lift.

During the operation the flock and graphite are exposed continuously to form a low friction surface as required to seal a rotating shaft to a stationary housing without undue wear on the parts.

The disc 25 also serves as a thrust bearing for the shaft 10 and it is to be understood that the disc may be used as a thrust bearing in connection with various parts which are subjected to high temperatures which would result in the rapid deterioration of thrust bearings composed of the usual bearing metals.

What is claimed is:

A high temperature packing gland comprising a cement selected from the group consisting of sodium silicate and magnesium oxychloride, a fabric composed of yarns of ceramic fibers selected from the group consisting of aluminum silicate fibers and quartz fibers, graphite particles and short lengths of yarn composed of polytetrafluoroethylene, said fabric, graphite particles and short lengths of polytetrafluoroethylene yarn being embedded in and impregnated with said cement, the short lengths of polytetrafluoroethylene yarn, in the form of a flock, being additionally exposed on the surface of said gland.

References Cited in the file of this patent

UNITED STATES PATENTS

| 2,219,054 | Palm et al. | Oct. 22, 1940 |
| 2,578,523 | Llewellyn | Dec. 11, 1951 |
| 2,591,383 | Spalding | Apr. 1, 1952 |
| 2,667,804 | Boyer et al. | Feb. 2, 1954 |
| 2,676,823 | Olson et al. | Apr. 27, 1954 |
| 2,717,841 | Biefield et al. | Sept. 13, 1955 |
| 2,893,897 | Uccelli | July 7, 1959 |
| 2,895,759 | Conrad et al. | July 21, 1959 |
| 2,918,316 | Runton et al. | Dec. 22, 1959 |

FOREIGN PATENTS

| 167,979 | Australia | July 25, 1956 |